UNITED STATES PATENT OFFICE.

ADRIEN BADIN, OF PARIS, FRANCE, ASSIGNOR TO SOCIÉTÉ GENERALE DES NITRURES, OF PARIS, FRANCE, A CORPORATION OF FRANCE.

PROCESS OF FIXATION OF NITROGEN.

1,196,639.  Specification of Letters Patent.  Patented Aug. 29, 1916.

No Drawing.  Application filed November 18, 1914.  Serial No. 872,837.

*To all whom it may concern:*

Be it known that I, ADRIEN BADIN, a citizen of the Republic of France, and a resident of 12 Rue Roquépine, at Paris, France, have invented a new and useful Process of Fixation of Nitrogen, of which the following is a specification.

If, in an electric oven of the type commonly used for the manufacture of carbid of calcium or ferro-silicon for instance, a mixture of bauxite (or other aluminous bodies) is treated with carbon, with or without a quantity of metallic iron, according to the amount of iron oxid contained in the bauxite, a complex body is obtained containing principally iron and aluminium accompanied by more or less complex compounds of these elements with carbon silicon, titanium, calcium and other elements contained in the bauxite. The complex body thus obtained possesses the following properties: When brought to a fine state of division, moistened and exposed to the air, gradual and spontaneous heating of the compound occurs, with production of combustible gases; the whole mass quickly attaining the temperature of combination of nitrogen and aluminium, is even brought to a temperature of the order of 2000° C. without any external heating whatsoever. The compound obtained under these conditions is impure nitrid of aluminium.

It has been found advantageous to mix with the compound produced by the electric oven, a quantity of porous material such as sawdust which adds porosity to the whole mass and allows of a good distribution of the moisture necessary to the reaction.

Once the initial rise of temperature has taken place, and the reaction has been started, it is possible to continue the reaction in an atmosphere of pure or impure nitrogen. The speed of the reaction can also be increased by the use of air or nitrogen under pressure or by blowing these gases over the surface of, or through the mass.

The reaction is accompanied by a considerable emission of heat; part of this heat can be utilized in order, for example, to produce the combination of nitrogen with mixtures or compounds which are capable of combining with it, such, for instance, as mixtures of bauxite and carbon added to the mass.

The bauxite can be replaced by other aluminous bodies. The use of certain bauxites or certain other aluminous bodies may necessitate the addition of a certain quantity of iron. This addition must be such that the mass contains preferably between 30 and 60% of iron, although the addition is by no means restricted to these quantities.

Instead of moistening the whole of the mass, it is sufficient to moisten the upper surface or, which is the same thing, to place on the upper surface a small quantity of the slightly moistened compound in which spontaneous heating takes place and which is brought thereby to a temperature sufficient to allow of the whole of the mass to itself enter into reaction and to attain the temperature necessary to its combination with nitrogen. It is also possible to produce a rise of temperature by utilizing, at least to a certain extent, the emission of heat, which occurs through the oxidizing of a portion of the ferro-aluminium in the mass. To obtain this emission of heat, heat is applied either to the whole mass or to a small portion of it in the presence of oxidizing agents brought to the temperature necessary for such oxidation to take place, the emission of heat through this oxidation increases the temperature gradually up to that necessary for the combination with nitrogen.

To increase the rapidity of the reaction, any of the known oxidizing agents can be used, such as chlorates, peroxids, nitrates or even air, and these agents may be used in connection with either total or partial moistening of the mass.

Where in the following claims I speak of the presence of nitrogen, I wish it to be understood that I mean to refer either to pure nitrogen or to air or other gaseous bodies containing nitrogen. So also the expression "aluminous body and iron" may mean bauxite or other aluminous body with iron added or containing sufficie ; iron naturally. And where the expression "moistening" is used, it is intended to refer to either partial or complete moistening.

Claims:

1. A process of fixation of nitrogen on the complex product obtained in treating at high temperature a mixture of carbon, an aluminous body and iron, the said process consisting in adding to the said product, previously finely pulverized, an agent to cause its spontaneous heating up to such a temperature that its combination with nitrogen can begin, the reaction continuing by itself in the presence of nitrogen.

2. A process of fixation of nitrogen on the complex product obtained in treating at high temperature a mixture of carbon, an aluminous body and iron, the said process consisting in pulverizing the said product, in moistening it, and in leaving it in contact with atmospheric air.

3. A process of fixation of nitrogen on the complex product obtained in treating at high temperature a mixture of carbon, an aluminous body and iron, the said process consisting in pulverizing the said product, in mixing it with porous substances and distributing such substances within the mass, in moistening the whole mass and in leaving it in contact with atmospheric air.

4. A process of fixation of nitrogen on the complex product obtained in treating at high temperature a mixture of carbon, an aluminous body and iron, the said process consisting in pulverizing the said product, in mixing it with sawdust, in moistening the mixture and in leaving it in contact with atmospheric air.

5. A process of fixation of nitrogen on the complex product obtained in treating at high temperature a mixture of carbon, an aluminous body and iron, the said process consisting in pulverizing the said product, in placing on its surface a small quantity of a mixture of the said pulverized body and of a porous body moistened with water, and in leaving the whole mass in contact with atmospheric air.

6. A process of fixation of nitrogen on the complex product obtained in treating at high temperature a mixture of carbon, an aluminous body and iron, the said process consisting in pulverizing the said product, in placing on its surface a mixture of the said product and of moistened sawdust, and in leaving the whole mass in contact with atmospheric air.

7. A process of fixation of nitrogen on the complex product obtained in treating at high temperature a mixture of carbon, an aluminous body and iron, the said process consisting in pulverizing the said product, in adding to it oxidizing agents, in starting a partial oxidation of the said mass by moderate heating, then in allowing its temperature to rise spontaneously in the presence of nitrogen until the fixation of nitrogen begins to take place, the reaction continuing by itself.

8. A process of fixation of nitrogen on the complex product obtained in treating at high temperature a mixture of carbon, an aluminous body and iron, the said process consisting in pulverizing the said product, in adding to it an oxidizing body, in starting the partial oxidation of the said mass by moderate heating, then in allowing its temperature to rise spontaneously in the presence of nitrogen until the fixation of nitrogen begins to take place, the reaction continuing by itself.

9. A process of fixation of nitrogen on the complex product obtained in treating at high temperature a mixture of carbon, an aluminous body and iron, the said process consisting in pulverizing the said product, in adding to it oxidizing agents, in moistening it and in leaving it in contact with atmospheric air.

10. A process of fixation of nitrogen on the complex product obtained in treating at high temperature a mixture of carbon, an aluminous body and iron, the said process consisting in pulverizing the said product, in adding to it an agent to allow of its spontaneous heating until it attains such temperature that the fixation of nitrogen can begin to take place, in allowing the reaction to continue in the presence of the atmospheric air and in completing the reaction in the presence of nitrogen.

In testimony whereof I have signed my name to this specification, in the presence of two subscribing witnesses.

ADRIEN BADIN.

Witnesses:
HENRY OSMOND HARNARD,
CHARLES DONY.

Copies of this patent may be obtained for five cents each, by addressing the "Commissioner of Patents, Washington, D. C."